(12) United States Patent
He et al.

(10) Patent No.: US 9,076,573 B2
(45) Date of Patent: Jul. 7, 2015

(54) HALOGEN-FREE RESIN COMPOSITION AND METHOD FOR FABRICATING HALOGEN-FREE COPPER CLAD LAMINATE USING THE SAME

(75) Inventors: Yueshan He, Dongguan (CN); Shiguo Su, Dongguan (CN)

(73) Assignee: Guangdong Shengyi Sci. Tech Co., Ltd., Guangdong (CN)

( * ) Notice: Subject to any disclaimer, the term of this patent is extended or adjusted under 35 U.S.C. 154(b) by 1 day.

(21) Appl. No.: 13/997,542

(22) PCT Filed: Sep. 3, 2011

(86) PCT No.: PCT/CN2011/079308
§ 371 (c)(1),
(2), (4) Date: Jun. 24, 2013

(87) PCT Pub. No.: WO2012/083728
PCT Pub. Date: Jun. 28, 2012

(65) Prior Publication Data
US 2013/0284358 A1     Oct. 31, 2013

(30) Foreign Application Priority Data

Dec. 23, 2010 (CN) .......................... 2010 1 0602780

(51) Int. Cl.
*C08K 5/07* (2006.01)
*H01B 3/40* (2006.01)
*B32B 5/02* (2006.01)
*B32B 15/14* (2006.01)
*C08J 5/24* (2006.01)
*H01B 19/04* (2006.01)

(52) U.S. Cl.
CPC ............. *H01B 3/40* (2013.01); *Y10T 156/1062* (2015.01); *B32B 5/024* (2013.01); *B32B 15/14* (2013.01); *B32B 2260/021* (2013.01); *B32B 2260/046* (2013.01); *B32B 2262/101* (2013.01); *C08J 5/24* (2013.01); *C08J 2363/00* (2013.01); *C08J 2371/12* (2013.01); *C08J 2379/04* (2013.01); *H01B 19/04* (2013.01)

(58) Field of Classification Search
USPC .......... 524/356, 425, 430, 433, 445, 449, 451
See application file for complete search history.

(56) References Cited

U.S. PATENT DOCUMENTS

| | | | |
|---|---|---|---|
| 2008/0132629 A1 | 6/2008 | Tzou | |
| 2009/0176104 A1 | 7/2009 | Chen et al. | |

FOREIGN PATENT DOCUMENTS

| | | |
|---|---|---|
| CN | 1548473 A | 11/2004 |
| CN | 1621444 A | 6/2005 |
| CN | 100999145 A | 7/2007 |
| CN | 1333014 C | 8/2007 |
| CN | 101735562 A | 6/2010 |
| CN | 102093666 A | 6/2011 |
| JP | 2004-27000 A | 1/2004 |

*Primary Examiner* — Edward Cain
(74) *Attorney, Agent, or Firm* — McDonald Hopkins LLC

(57) ABSTRACT

The present invention relate to a halogen-free resin composition and a method for fabricating a halogen-free copper clad laminate using the same. The halogen-free resin composition comprises the following components: reactive small molecular polyphenylene oxide with a number average molecular weight of 500-3000, a polybenzoxazine resin, a phosphorus-containing epoxy resin, a composite curing agent, a curing promoter, a filler, and a benzene or ketone solvent. The method for fabricating a halogen-free copper clad laminate comprises: Step 1: dissolving reactive small molecular polyphenylene oxide with a number average molecular weight of 500-3000 in a benzene or ketone solvent, adding a polybenzoxazine resin after dissolution, and mixing by stirring, to prepare a solution for use; Step 2: adding a phosphorus-containing epoxy resin, a composite curing agent, a curing promoter, and a filler to the solution for use, and stirring uniformly, to obtain a colloidal solution; Step 3: evenly coating the prepared colloidal solution to E-glass cloth with an even surface and baking, to produce a B-stage partially cured prepreg; and Step 4: cutting the B-stage partially cured prepreg into a suitable size according to the size of a compressor, precisely overlaying, placing a copper foil on and under the laminated B-stage partially cured Prepregs, and pressing in a vacuum hot pressing machine, to obtain a halogen-free copper clad laminate.

6 Claims, 1 Drawing Sheet

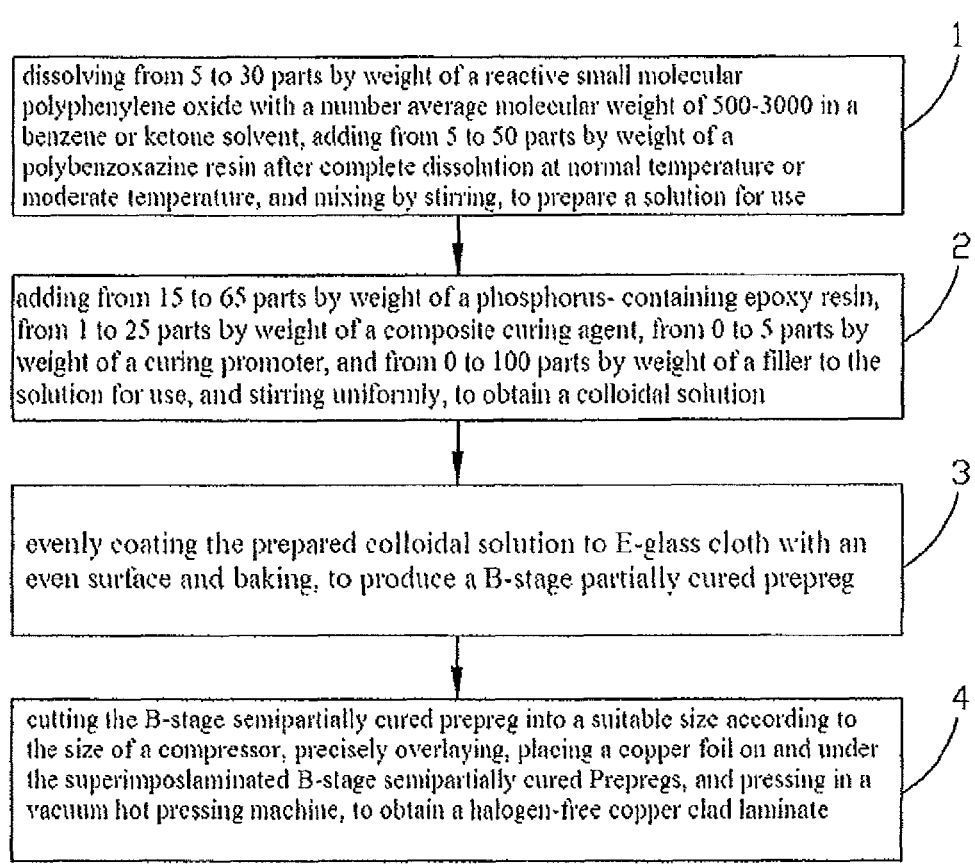

HALOGEN-FREE RESIN COMPOSITION AND METHOD FOR FABRICATING HALOGEN-FREE COPPER CLAD LAMINATE USING THE SAME

TECHNICAL FIELD

The present invention relates to field of copper clad laminates, in particular to a halogen-free resin composition and a method for fabricating halogen-free copper clad laminate using the same.

BACKGROUND ART

Currently, electronic industry and electrical industry are rapidly developing, and require electronic products to be developed in the direction of lightweight thinning, high performance, high reliability and environmental protection. Thus there is a higher demand on the printed circuit board and copper clad foil plate. The products thereof are required to have a high heat resistance, a low coefficient of thermal expansion, a high humidity resistance, environmental protection, flame retarding resistance, a low dielectric constant and dielectric loss and a high elastic modulus.

The combustion of copper clad plates of halides and antimonide not only produces a large volume of smoke and a unpleasant smell, but also emits hydrogen halide gas having a great toxicity and a strong causticity, which pollutes the environment and endangers human health. At present, a phosphorous-containing resin is generally and industrially used to achieve the flame retarding effect, i.e. epoxy resin corresponding to phosphorous-containing compounds DOPO or ODOPB. However, the impregnated sheet materials will cause many problems, such as low heat resistance, high water absorption, worse chemical resistance and the like.

In order to solve said problems, ZL200410051855.3 discloses improving phosphorous-containing epoxy resin by using the resin containing dihydrobenzoxazine to increase heat resistance, chemical resistance and to decrease water absorption. However, the resin containing dihydrobenzoxazine cannot achieve the fire performance standard V-0 in UL94. Moreover, such resin is very fragile and difficult to achieve the processing requirements on the printed circuit board. In addition, dihydrobenzoxazine per se has a very curing temperature of more than 200° C., so that it is difficult for the sheet materials to be completely cured.

CN1333014C discloses the technique of directly filling the macromolecular polyphenyl ether into said system, which is actually difficult to achieve the expected effect due to the difficulties of filling the organic macromolecular fillers, mixing and coating glue, and of homogeneous dispersion. The polymers cannot be plasticized unless the polyphenyl ether molecules are crosslinked to the polymers, which causes a slight reduction of the dielectric constant and dielectric loss. Polyphenyl ether per se has a flame retarding structure, but its flame resistance is greatly decreased due to the introduction of reactive groups and the reduction of molecular weight.

CONTENTS OF THE INVENTION

The object of the present invention lies in providing a halogen-free resin composition, having excellent heat resistance, moisture resistance and a low dielectric loss.

Another object of the present invention lies in providing a method for fabricating a halogen-free copper clad laminate using the halogen-free resin composition, which has a simple operation. The halogen-free copper clad laminate fabricated thereby meets the halogen-free requirements, has the advantages of excellent heat resistance, humidity resistance and a low dielectric loss.

In order to achieve said object, the present invention provides a halogen-free resin composition, comprising from 5 to 30 parts by weight of reactive small molecular polyphenylene oxide with a number average molecular weight of 500-3000, from 5 to 50 parts by weight of a polybenzoxazine resin, from 15 to 65 parts by weight of a phosphorus-containing epoxy resin, from 1 to 25 parts by weight of a composite curing agent, from 0 to 5 parts by weight of a curing promoter, from 0 to 100 parts by weight of a filler, and a suitable amount of benzene or ketone solvent.

The amount of each ingredient is based on 100 parts by weight of the total weight of the organic solids.

The reactive small molecular polyphenylene oxide has the following chemical structural formula

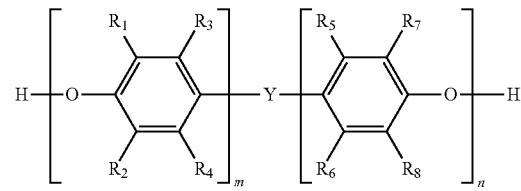

wherein m and n are 0-25, at least one of m and n is not 0; Y is selected from

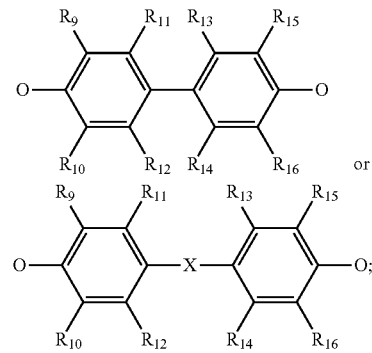

X is alkyl, —S—, —O—,

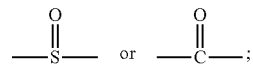

$R_1$, $R_2$, $R_7$, $R_8$, $R_9$, $R_{10}$, $R_{11}$, $R_{15}$ and $R_{16}$ are identical or different alkyl groups having a carbon atom number of less than 6 or phenyl; $R_3$, $R_4$, $R_5$, $R_6$, $R_{12}$, $R_{13}$ and $R_{14}$ are identical or different a hydrogen atom or alkyl groups having a carbon atom number of less than 6 or phenyl;

The polybenzoxazine resin comprises one or more selected from the group consisting of the following structures

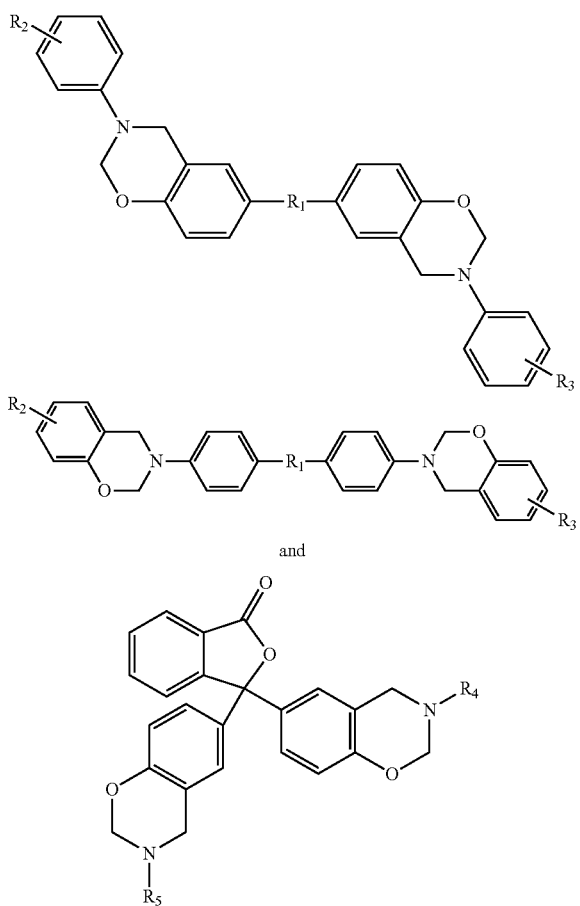

wherein $R_2$ and $R_3$ are mono- or poly-substituted; $R_2$ and $R_3$ are H, methyl, allyl, alkynyl or aldehyde group; $R_1$ is

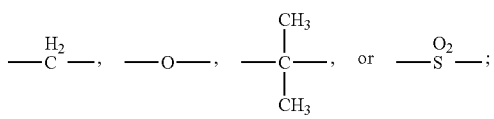

$R_4$ and $R_5$ are each independently allyl, unsubstituted or substituted phenyl, unsubstituted or substituted C1-C8-alkyl, unsubstituted or substituted C1-C8-cycloalkyl.

The basic epoxy resin in the phosphorus-containing epoxy resin is difunctional epoxy resin, polyfunetional epoxy resin, or mixture thereof, and has a sulfur content of 2-5%, and an epoxy equivalent of 200-600 g/mol. The halogen content in said colloidal solution falls within the RCA halogen-free standard scope, i.e. less than 0.09 part by weight, so as to better achieve the environmental protection effect.

The phosphorus-containing epoxy resin is preferably in an amount of from 25 to 55 parts by weight.

The composite curing agent is one or more selected from the group consisting of dicyandiamide, aromatic amine, anhydride, phenols and phosphorus-containing phenolic aldehyde.

The curing promoter is one or more selected from the group consisting of 2-methylimidazole, 2-ethyl-4-methylimidazole, 2-phenylimidazole, DMP-30 and hexamethylenetetramine.

The filler is an inorganic or organic filler, wherein the inorganic filler is one or more selected from the group consisting of aluminium hydroxide, magnesium hydroxide, zeolite, wollastonite, silica, magnesia, calcium silicate, calcium carbonate, clay, talc and mica. The amount of the inorganic filler may be suitably adjusted according to the use, and is preferably from 0-100 parts by weight, most preferably from 25 to 100 parts by weight based on 100 parts by weight of the total weight of the organic solids in the components of the colloidal solution composition.

Meanwhile, the present invention further provides a method for fabricating a halogen-free copper clad laminate using the halogen-free resin composition according to claim 1, comprises the steps of Step 1; dissolving from 5 to 30 parts by weight of a reactive small molecular polyphenylene oxide with a number average molecular weight of 500-3000 in a benzene or ketone solvent, adding from 5 to 50 parts by weight of a polybenzoxazine resin after complete dissolution at normal temperature or moderate temperature, and mixing by stirring, to prepare a solution for use;

Step 2: adding from 15 to 65 parts by weight of a phosphorus-containing epoxy resin, from 1 to 25 parts by weight of a composite curing agent, from 0 to 5 parts by weight of a curing promoter, and from 0 to 100 parts by weight of a filler to the solution for use, and stirring uniformly, to obtain a colloidal solution;

Step 3: evenly coating the prepared colloidal solution to E-glass cloth with an even surface and baking, to produce a B-stage partially cured prepreg; and Step 4: cutting the B-stage partially cured prepreg into a suitable size according to the size of a compressor, precisely overlaying, placing a copper foil on and under the laminated B-stage partially cured Prepregs, and pressing in a vacuum hot pressing machine, to obtain a halogen-free copper clad laminate.

The moderate temperature in Step 1 ranges from 30-80° C.

During the baking of a B-stage partially cured prepreg, the baking is set up according to the boiling point of the solvent used for the colloidal solution to be 85-175° C. for 5-20 minutes.

In Step 4, the pressing is conducted by using bench pressing, having the specific steps of increasing from room temperature to 150° C. within 15 min, remaining for 30 min, increasing to 180° C. within 5 min, remaining for 2 h, finally decreasing to room temperature within 30 min; increasing the pressure from 0 to 0.6 Mpa within 1 min, remaining for 20 min, then increasing to 1.0 Mpa within 1 min, remaining for 2.5 h, post-processing at 200-245° C. and remaining for 0-5 h.

The present invention has the following beneficial effects. The method for fabricating the halogen-free copper clad lamination of the present invention has a simple operation, and the fabricated copper clad lamination has the advantages of excellent heat resistance, humidity resistance, a low dielectric loss, a better piercing processability of the sheet materials. The halogen content falls within the JPCA halogen-free standard scope, and can achieve the V-0 standard in the fire resistance test UL-94.

DESCRIPTION OF THE FIGURES

The embodiments of the present invention are detailedly described by combining with the drawings, so as to make the technical solution of the present invention and other beneficial effects obvious.

FIG. 1 represents the flow chart of the method for fabricating a halogen-free copper clad laminate of the present invention.

EMBODIMENTS

The halogen-free resin composition of the present invention comprises, based on 100 parts by weight of the total weight of the organic solids, from 5 to 30 parts by weight of reactive small molecular polyphenylene oxide with a number average molecular weight of 500-3000, from 5 to 50 parts by weight of a polybenzoxazine resin, from 15 to 65 parts by weight of a phosphorus-containing epoxy resin, from 1 to 25 parts by weight of a composite curing agent, from 0 to 5 parts by weight of a curing promoter, from 0 to 100 parts by weight of a filler, and a suitable amount of benzene or ketone solvent. The halogen-free resin composition is used to fabricate a copper clad laminate which meets the halogen-free requirements and has the advantages of excellent heat resistance, humidity resistance and a low dielectric loss.

The reactive small molecular polyphenylene oxide has the following chemical structural formula

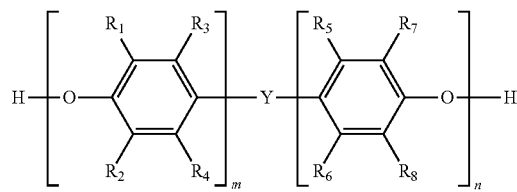

wherein m and n are 0-25, at least one of m and n is not 0; Y is selected from

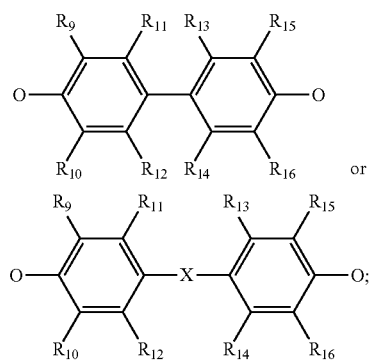

X is alkyl, —S—, —O—,

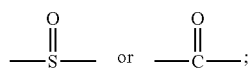

$R_1$, $R_2$, $R_7$, $R_8$, $R_9$, $R_{10}$, $R_{11}$, $R_{15}$ and $R_{16}$ are identical or different alkyl groups having a carbon atom number of less than 6 or phenyl; $R_3$, $R_4$, $R_5$, $R_6$, $R_{12}$, $R_{13}$ and $R_{14}$ are identical or different a hydrogen atom or alkyl groups having a carbon atom number of less than 6 or phenyl;

The polybenzoxazine resin comprises one or more selected from the group consisting of the following structures

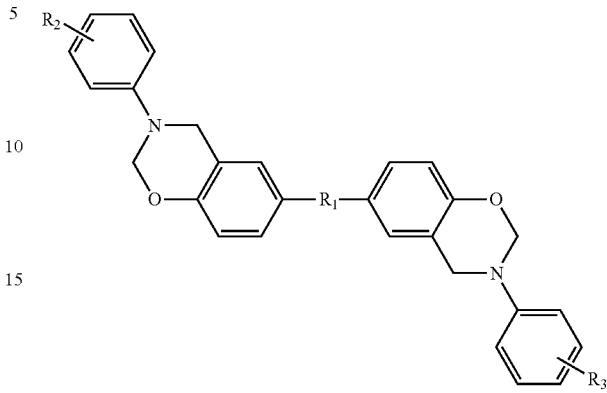

and

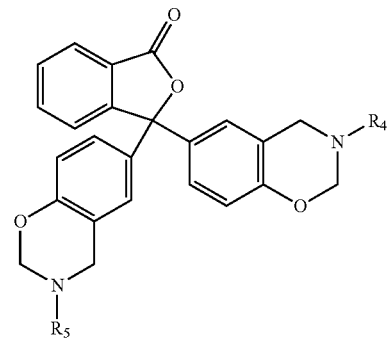

wherein $R_2$ and $R_3$ are mono- or poly-substituted; $R_2$ and $R_3$ are H, methyl, allyl, alkynyl or aldehyde group; $R_1$ is

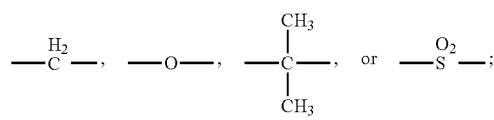

$R_4$ and $R_5$ are each independently allyl, unsubstituted or substituted phenyl, unsubstituted or substituted C1-C8-alkyl, unsubstituted or substituted C1-C8-cycloalkyl.

The basic epoxy resin in the phosphorus-containing epoxy resin is difunctional epoxy resin, polyfunctional epoxy resin, or mixture thereof, and has a sulfur content of 2-5%, and an epoxy equivalent of 200-600 g/mol. The halogen content in said colloidal solution falls within the JPGA halogen-free standard scope, i.e. less than 0.09 part by weight, so as to better achieve the environmental protection effect. The phosphorus-containing epoxy resin is preferably in an amount of from 25 to 55 parts by weight.

The composite curing agent is one or more selected from the group consisting of dicyandiamide, aromatic amine, anhydride, phenols and phosphorus-containing phenolic aldehyde. The curing promoter is one or more selected from the group consisting of 2-methylimidazole, 2-ethyl-4-methylimidazole, 2-phenylimidazole, DMP-30 and hexamethylenetetramine.

The filler is an inorganic or organic filler, wherein the inorganic filler is one or more selected from the group consisting of aluminium hydroxide, magnesium hydroxide, zeolite, wollastonite, silica, magnesia, calcium silicate, calcium carbonate, clay, talc and mica. The amount of the inorganic filler may be suitably adjusted according to the use, and is preferably from 0-100 parts by weight, most preferably from 25 to 100 parts by weight based on 100 parts by weight of the total weight of the organic solids in the components of the colloidal solution composition.

As shown in FIG. 1, the present invention provides a method for fabricating a halogen-free copper clad laminate using the halogen-free resin composition, comprises the steps of Step 1: dissolving from 5 to 30 parts by weight of a reactive small molecular polyphenylene oxide with a number average molecular weight of 500-3000 in a benzene or ketone solvent, adding from 5 to 50 parts by weight of a polybenzoxazine resin after complete dissolution at normal temperature or moderate temperature, and mixing by stirring, to prepare a solution for use;

Step 2: adding from 15 to 65 parts by weight of a phosphorus-containing epoxy resin, from 1 to 25 parts by weight of a composite curing agent, from 0 to 5 parts by weight of a curing promoter, and from 0 to 100 parts by weight of a filler to the solution for use, and stirring uniformly, to obtain a colloidal solution;

Step 3: evenly coating the prepared colloidal solution to E-glass cloth with an even surface and baking, to produce a B-stage partially cured prepreg; during the baking of a B-stage partially cured prepreg, the baking is set up according to the boiling point of the solvent used for the colloidal solution to be 85-175° C. for 5-20 minutes; and Step 4: cutting the B-stage partially cured prepreg into a suitable size according to the size of a compressor, precisely overlaying, placing a copper foil on and under the laminated B-stage partially cured prepregs, and pressing in a vacuum hot pressing machine, to obtain a halogen-free copper clad laminate. The pressing is conducted by using bench pressing, having the specific steps of increasing from room temperature to 150° C. within 15 min, remaining for 30 min, increasing to 180° C. within 5 min, remaining for 2 h, finally decreasing to room temperature within 30 min; increasing the pressure from 0 to 0.6 Mpa within 1 min, remaining for 20 min, then increasing to 1.0 Mpa within 1 min, remaining for 2.5 h, post-processing at 200-245° C. and remaining for 0-5 h.

In the present invention, the introduction of reactive small molecular PPO (polyphenylene ether) into the phosphorous-containing epoxy/benzoxazine system not only improves the electrical property of the system (for example to reduce and stabilize Dk), but also enhances the toughness of the system, so as to make it more suitable for the fabrication of higher level PCB. In addition, the use of the composite curing agent and auxiliary agents also effectively catalyzes the polymerization of benzoxazine, PPO and epoxy.

The present invention is further described with two types of example of the flame retarding circuit lines, but the present invention is not limited within the scopes of the examples.

The ingredients used in the examples and comparative examples of the present invention are explained as follows. Unless otherwise specified, the % represents "wt. %".

Reactive Small Molecular polyphenylene oxide
(A) MX90 (SABIC Innovative Plastics trade name)
Polybenzoxazine Resin
(B-1) LZ 8280 (Huntsman Advanced Materials trade name)
(B-2) XU 8282-1 (Huntsman Advanced Materials trade name)
(B-3) D125 (Sichuan EM Technology Co., Ltd. (Group) trade name)
Phosphorus-Containing Epoxy Resin
(C-1) XZ92530 (DOW CHEMICALS trade name)
(C-2) YEP250 (Quzhou Guangshan Chemical Co., Ltd trade name)
Composite Curing Agent
(D-1) dicyanodiamide
(D-2) diaminodiphenyl sulphone
(D-3) PS 6313 (Gun-Ei Chemical Industry Co Ltd brand name, having a nitrogen content of 20%, and a hydroxyl equivalent of 148)
(D-3) XZ92741 (DOW CHEMICALS trade name)
Curing Promoter
2-ethyl-4-methylimidazole
Inorganic Filler
(F-1) aluminium hydroxide (having an average particle size of 3-5 μm and a purity of more than 99%)
(F-2) 525 (molten silica, Sibeleo trade name)

First Type of Examples 5 to 30 parts by weight of reactive small molecular polyphenylene ether having a number average molecular weight of 500 to 3,000 was dissolved in a benzene or ketone solvents. 5 to 50 parts by weight of polybenzoxazine resin was added after complete dissolution at room temperature or moderate temperature to mix by stirring and to prepare a solution for use. From 15 to 65 parts by weight of a phosphorus-containing epoxy resin, from 1 to 25 parts by weight of a composite curing agent, from 0 to 5 parts by weight of a curing promoter, and from 0 to 100 parts by weight of a filler primarily containing alumina were added to the solution for use and stirred uniformly to obtain a colloidal solution. 300× 300 cm E-glass cloth with an even surface was evenly coated with the colloidal solution, baked in an oven at 155° C. for 7 minutes to obtain a bonding sheet (B-stage partially cured prepreg). 5 bonding sheets whose rough edges are cut were laminated, and a copper foil having a thickness of 35 μm was placed on and under the laminated bonding sheets. The bonding sheets were pressed in a vacuum hot pressing machine to obtain a halogen-free copper clad laminate. A bench pressing method (multiple-step temperature and pressing increasing) was used for pressing, comprising increasing from room temperature to 150° C. within 15 min and remaining for 30 min, increasing to 180° C. within 5 min and remaining for 2 h, finally decreasing to room temperature within 30 min; increasing the pressure from 0 to 0.6 Mpa within 1 min and remaining for 20 min, then increasing to 1.0 Mpa within 1 min and remaining for 2.5 h. The composition formulation of the colloidal solution and the performances of the fabricated copper clad laminate in the specific Examples 1-3 and Comparative Examples 1-2 are shown in Tables 1 and 2 below.

TABLE 1

Formulation of the colloidal compositions (I) (parts by weight)

|     | Example 1 | Example 2 | Example 3 | Comparative Example 1 | Comparative Example 2 |
|-----|-----------|-----------|-----------|------------------------|------------------------|
| A   | 15        | 28        | 10        | 0                      | 0                      |
| B1  | 0         | 0         | 46        | 0                      | 0                      |
| B2  | 0         | 22        | 0         | 0                      | 48                     |
| B3  | 49        | 0         | 0         | 48                     | 0                      |
| C1  | 0         | 0         | 42        | 0                      | 0                      |
| C2  | 42        | 42        | 0         | 48                     | 44                     |
| D1  | 0         | 0         | 0         | 0                      | 0                      |
| D2  | 4.0       | 0         | 2.0       | 4.0                    | 0                      |
| D3  | 0         | 8.0       | 0         | 0                      | 8.0                    |
| E   | 0.1       | 0.1       | 0.1       | 0.1                    | 0.1                    |
| F-1 | 30        | 30        | 30        | 30                     | 30                     |
| F-2 | 10        | 10        | 10        | 10                     | 10                     |

Notes:
the benchmark of the parts by weight is based on 100 parts wt. % of the organic solids of the ingredients (A), (B), (C) and (D).

TABLE 2

Characteristic evaluation (I)

|  | Example 1 | Example 2 | Example 3 | Comparative Example 1 | Comparative Example 2 |
|---|---|---|---|---|---|
| Glass transition temperature (° C.) | 160 | 185 | 155 | 158 | 178 |
| Peeling strength (N/mm) | 1.43 | 1.35 | 1.48 | 1.50 | 1.45 |
| Burning resistance (1.600 mm) | V-0 | V-0 | V-1 | V-0 | V-0 |
| Soldering resistance (delamination) | ○ | ○ | ○ | ○ | ○ |
| Soldering resistance (white plague) | ○ | ○ | ○ | ○ | ○ |
| Water absorption (%) | 0.11 | 0.10 | 0.11 | 0.12 | 0.12 |
| Dielectric constant (1 GHz) | 5.0 | 4.9 | 5.0 | 5.2 | 5.1 |
| Dielectric loss (1 GHz) | 0.006 | 0.005 | 0.007 | 0.011 | 0.010 |
| Bending strength (transversal) (N/mm2) | 655 | 650 | 640 | 565 | 450 |
| Piercing | ○ | ○ | ○ | Δ | Δ |

Second Type of Examples 5 to 30 parts by weight of reactive small molecular polyphenylene ether having a number average molecular weight of 500 to 3,000 was dissolved in a benzene or ketone solvents. 5 to 50 parts by weight of polybenzoxazine resin was added after complete dissolution at room temperature or moderate temperature to mix by stirring and to prepare a solution for use. From 15 to 65 parts by weight of a phosphorus-containing epoxy resin, from 1 to 25 parts by weight of a composite curing agent primarily containing phosphorous-containing phenolic aldehyde, from 0 to 5 parts by weight of a curing promoter, and from 0 to 100 parts by weight of a filler containing no alumina were added to the solution for use and stirred uniformly to obtain a colloidal solution, 300×300 cm E-glass cloth with an even surface was evenly coated with the colloidal solution, baked in an oven at 155° C. for 7 minutes to obtain a bonding sheet (B-stage partially cured prepreg). 5 bonding sheets whose rough edges are cut were laminated, and a copper foil having a thickness of 35 μm was placed on and under the laminated bonding sheets. The bonding sheets were pressed in a vacuum hot pressing machine to obtain a halogen-free copper clad laminate. A bench pressing method (multiple-step temperature and pressing increasing) was used for pressing, comprising increasing from room temperature to 150° C. within 15 min and remaining for 30 min, increasing to 180° C. within 5 min and remaining for 2 h, finally decreasing to room temperature within 30 min; increasing the pressure from 0 to 0.6 Mpa within 1 min and remaining for 20 min, then increasing to 1.0 Mpa within 1 min and remaining for 2.5 h. The composition formulation of the colloidal solution and the performances of the fabricated copper clad laminate in the specific Examples 4-6 and Comparative Examples 3-4 are shown in Tables 3 and 4 below.

TABLE 3

Formulation of the colloidal compositions (II) (parts by weight)

|     | Example 4 | Example 5 | Example 6 | Comparative Example 3 | Comparative Example 4 |
|-----|-----------|-----------|-----------|------------------------|------------------------|
| A   | 15        | 28        | 10        | 0                      | 0                      |
| B1  | 0         | 0         | 31        | 0                      | 0                      |
| B2  | 0         | 20        | 0         | 0                      | 33                     |
| B3  | 34        | 0         | 0         | 33                     | 0                      |
| C1  | 0         | 0         | 42        | 0                      | 0                      |
| C2  | 42        | 29        | 0         | 48                     | 44                     |
| D1  | 0         | 0         | 0         | 0                      | 0                      |
| D2  | 4.0       | 0         | 2.0       | 4.0                    | 0                      |
| D3  | 0         | 8.0       | 0         | 0                      | 8.0                    |
| D4  | 15        | 15        | 15        | 15                     | 15                     |
| E   | 0.1       | 0.1       | 0.1       | 0.1                    | 0.1                    |
| F-1 | 0         | 0         | 0         | 0                      | 0                      |
| F-2 | 40        | 40        | 40        | 40                     | 40                     |

Notes:
the benchmark of the parts by weight is based on 100 parts wt. % of the organic solids of the ingredients (A), (B), (C) and (D).

TABLE 4

Characteristic evaluation (II)

|  | Example 4 | Example 5 | Example 6 | Comparative Example 3 | Comparative Example 4 |
|---|---|---|---|---|---|
| Glass transition temperature (° C.) | 158 | 183 | 152 | 155 | 175 |
| Peeling strength (N/mm) | 1.45 | 1.38 | 1.44 | 1.41 | 1.47 |
| Burning resistance (1.600 mm) | V-0 | V-0 | V-1 | V-0 | V-0 |
| Soldering resistance (delamination) | ○ | ○ | ○ | ○ | ○ |
| Soldering resistance (white plague) | ○ | ○ | ○ | ○ | ○ |
| Water absorption (%) | 0.11 | 0.10 | 0.11 | 0.13 | 0.13 |
| Dielectric constant (1 GHz) | 4.2 | 4.0 | 4.4 | 4.8 | 4.6 |
| Dielectric loss (1 GHz) | 0.006 | 0.005 | 0.007 | 0.011 | 0.010 |
| Bending strength (transversal) (N/mm2) | 650 | 645 | 640 | 558 | 460 |
| Piercing | ○ | ○ | ○ | Δ | Δ |

The above characteristics are measured by the following methods.
(1) Glass Transition Temperature (° C.)
In accordance with the differential scanning calorimetry, the DSC method stipulated under IPC-TM-650 2.4.25 is conducted for measurement.
(2) Peeling Strength (PS)
According to the test conditions of "after thermal stress" in the method in accordance with IPC-TM-650 2.4.8, the peeling strength of the metal cover coat is tested.

(3) Burning Resistance

In accordance with UL94

(4) Soldering Resistance

The samples (the basis material having a size of 100×100 mm) which remained in pressure cooking device (121° C., 105 Kpa) for 2 hours were impregnated in a solder bath heated to 260° C. for 20 seconds, to observe with eyes (h1) presence of delamination, (h2) presence of white plaque or wrinkling. O in the table represents no change; Δ represents white plaque; x represents delamination.

(5) Water Absorption (%)

In accordance with IPC-TM-650 2.6.2.1

(6) Dielectric Constant and Dielectric Loss (1 GHz)

According to the resonance method of using strip lines, dielectric loss and dielectric loss factor at 1 GHz are measured in accordance with IPC-TM-650 2.5.5.5

(7) Bending Strength

In accordance with IPC-TM-650 2.4.4, the bending strength of applying the load to the samples having the stipulated size and shape.

(8) Piecing

The sheet materials having a thickness of 1.60 mm are put onto a punch die having a certain FIGURE for piecing, to observe with eyes (h1) absence of bright border at the pore edge; (h2) presence of bright border at the pore edge; (h3) cleavage of the pore edge, represented with O, Δ and x in the table.

According to the results above, it can be seen that the present invention can achieve the efficacy of not decreasing Tg (glass transition temperature), decreasing the water absorption, dielectric constant and dielectric loss factor, and improve the system ductility. The halogen-free copper clad laminate fabricated thereby has a better piercing processability, and a halogen content falling within the JPCA halogen-free standard scope, and can achieve the V-0 standard in the fire resistance test UL-94

The aforesaid examples are not used to limit the content of the composition of the present invention. Any minute amendment, equivalent changes and modifications to said examples on the basis of the technical essence or composition ingredients or content thereof of the present invention still fall within the scope of the technical solution of the present invention.

The invention claimed is:

1. A halogen-free resin composition, comprising from 5 to 30 parts by weight of reactive small molecular polyphenylene oxide with a number average molecular weight of 500-3000, from 5 to 50 parts by weight of a polybenzoxazine resin, from 15 to 65 parts by weight of a phosphorus-containing epoxy resin, from 1 to 25 parts by weight of a composite curing agent primarily containing phosphorous-containing phenolic aldehyde, from 0 to 5 parts by weight of a curing promoter, from 0 to 100 parts by weight of a filler, and an amount of benzene or ketone solvent in which the polyphenylene oxide can be completely dissolved;

wherein the phosphorous-containing phenolic aldehyde accounts for 65-88% based on the total weight of the composite curing agent.

2. The halogen-free resin composition according to claim 1, wherein the reactive small molecular polyphenylene oxide has the following chemical structural formula

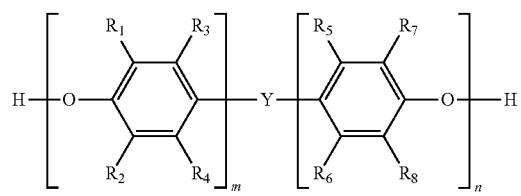

wherein m and n are 0-25, at least one of m and n is not 0;

Y is selected from

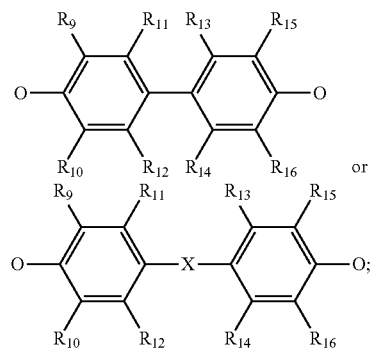

X is alkyl, —S—, —O—,

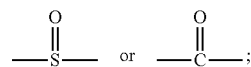

R1, R2, R7, R8, R9, R10, R11, R15 and R16 are identical or different alkyl groups having a carbon atom number of less than 6 or phenyl; R3, R4, R5, R6, R12, R13 and R14 are identical or different, are hydrogen atom or alkyl groups having a carbon atom number of less than 6 or phenyl.

3. The halogen-free resin composition according to claim 1, wherein the polybenzoxazine resin comprises one or more selected from the group consisting of the following structures

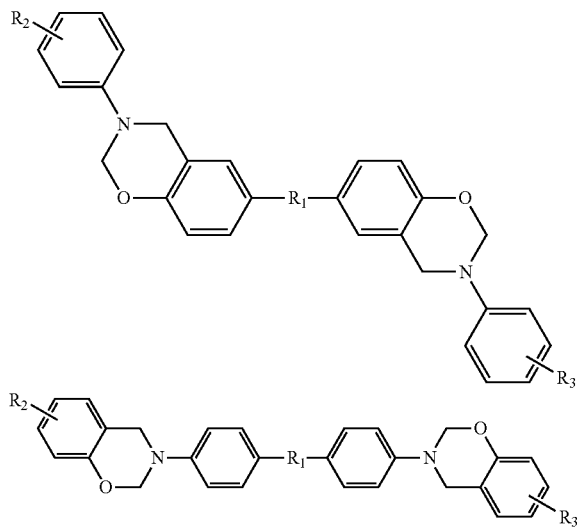

-continued and

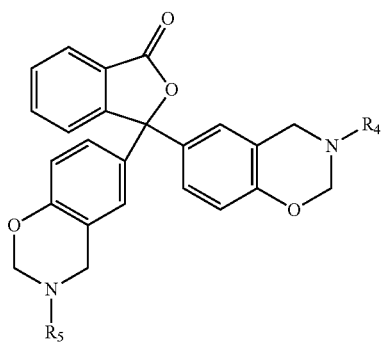

wherein R2 and R3 are mono- or poly-substituted; R2 an R3 are H, methyl, a alkynyl or aldehyde group; R1 is

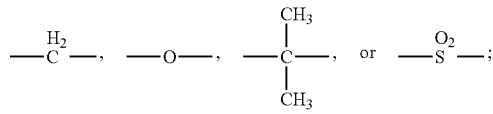

R4 and R5 are each independently unsubstituted or substituted phenyl, unsubstituted or substituted C1-C8-alkyl, unsubstituted or substituted C1-C8-cycloalkyl.

4. The halogen-free resin composition according to claim 1, wherein the basic epoxy resin in the phosphorus-containing epoxy resin is difunctional epoxy resin, polyfunctional epoxy resin, or mixture thereof, and has a sulfur content of 2-5%, and an epoxy equivalent of 200-600 g/mol.

5. The halogen-free resin composition according to claim 1, wherein the composite curing agent further comprises one or more selected from the group consisting of dicyandiamide, aromatic amine, anhydride and phenols.

6. The halogen-free resin composition according to claim 1, wherein the curing promoter is one or more selected from the group consisting of 2-methylimidazole, 2-ethyl-4-methylimidazole, 2-phenylimidazole, DMP-30 and hexamethylenetetramine; the filler is an inorganic or organic filler, wherein the inorganic filler is one or more selected from the group consisting of aluminium hydroxide, magnesium hydroxide, zeolite, wollastonite, silica, magnesia, calcium silicate, calcium carbonate, clay, talc and mica.

* * * * *